(12) United States Patent
Little et al.

(10) Patent No.: US 8,066,642 B1
(45) Date of Patent: Nov. 29, 2011

(54) SYSTEMS AND METHODS FOR ULTRASOUND BEAM FORMING DATA CONTROL

(75) Inventors: Blake W. Little, Bothell, WA (US); Thomas M. Duffy, Snohomish, WA (US); Justin Coughlin, Seattle, WA (US)

(73) Assignee: SonoSite, Inc., Bothell, WA (US)

( * ) Notice: Subject to any disclaimer, the term of this patent is extended or adjusted under 35 U.S.C. 154(b) by 1887 days.

(21) Appl. No.: 11/121,311

(22) Filed: May 3, 2005

(51) Int. Cl.
A61B 8/00 (2006.01)

(52) U.S. Cl. .......... 600/447; 600/444; 600/445; 73/625

(58) Field of Classification Search .......... 600/437–459; 73/625–633
See application file for complete search history.

(56) References Cited

U.S. PATENT DOCUMENTS

| | | | |
|---|---|---|---|
| 5,526,325 A * | 6/1996 | Sullivan et al. | 367/138 |
| 5,722,412 A | 3/1998 | Pflugrath et al. | |
| 5,817,024 A * | 10/1998 | Ogle et al. | 600/447 |
| 6,102,863 A * | 8/2000 | Pflugrath et al. | 600/447 |
| 6,113,547 A * | 9/2000 | Catallo et al. | 600/459 |
| 6,117,085 A * | 9/2000 | Picatti et al. | 600/459 |
| 6,135,961 A | 10/2000 | Pflugrath et al. | |
| 6,142,946 A * | 11/2000 | Hwang et al. | 600/459 |
| 6,203,498 B1 | 3/2001 | Bunce et al. | |
| 6,383,139 B1 | 5/2002 | Hwang et al. | |
| 6,416,475 B1 | 7/2002 | Hwang et al. | |
| 6,447,451 B1 | 9/2002 | Wing et al. | |
| 6,471,651 B1 | 10/2002 | Hwang et al. | |
| 6,575,908 B2 | 6/2003 | Barnes et al. | |
| 6,615,071 B1 * | 9/2003 | Casscells, III et al. | 600/474 |
| 6,618,206 B2 | 9/2003 | Tarakci et al. | |
| 6,663,567 B2 | 12/2003 | Ji et al. | |
| 6,685,645 B1 | 2/2004 | McLaughlin et al. | |
| 6,733,455 B2 | 5/2004 | Mo et al. | |
| 6,773,399 B2 | 8/2004 | Xi et al. | |
| 6,866,632 B1 | 3/2005 | Chou et al. | |
| 6,896,658 B2 | 5/2005 | Ji et al. | |
| 6,936,008 B2 | 8/2005 | Tarakci et al. | |
| 2005/0131294 A1 | 6/2005 | Ji et al. | |

FOREIGN PATENT DOCUMENTS

DE 2003/10224234 1/2003

* cited by examiner

*Primary Examiner* — Sanjay Cattungal
(74) *Attorney, Agent, or Firm* — Perkins Coie LLP

(57) ABSTRACT

Disclosed are systems and methods which efficiently control storage of and/or access to data which includes repetitive data or data which is used by different modes, processes, etcetera. Embodiments provide control for storage of and/or access to large amounts of data used in ultrasound system beam forming for image generation using a hierarchy of sequencers for controlling storage of and/or access to data. A frame sequencer may provide control at a frame level while an address sequencer is implemented to provide control at a data access level.

26 Claims, 2 Drawing Sheets

SYSTEMS AND METHODS FOR ULTRASOUND BEAM FORMING DATA CONTROL

CROSS-REFERENCE TO RELATED APPLICATIONS

The present application is related to co-pending and commonly assigned U.S. patent application Ser. No. 10/745,827, entitled "Ultrasonic Signal Processor For A Hand Held Ultrasonic Diagnostic Instrument," filed Dec. 24, 2003; and Ser. No. 10/099,474, entitled "Balance Body Ultrasound System," filed Mar. 15, 2002, the disclosures of which are hereby incorporated herein by reference.

TECHNICAL FIELD

The present invention relates generally to controlling storage of and/or access to data and, more particularly, to controlling storage of and/or access to ultrasound beam forming data.

BACKGROUND OF THE INVENTION

Ultrasound systems operable to provide images using transmission of ultrasonic energy are well known. Such systems typically employ a transducer assembly having an array of transducers where controlled excitation of the transducers causes an ultrasound wavefront to propagate into an adjacent medium, e.g., a human body. The ultrasound wavefront travels through the medium until reflected by an object or other variation in density of the medium experienced by the propagating wavefront. The ultrasound system uses the portion of the reflected ultrasound energy received by the array of transducers to process an image.

Beam forming techniques (e.g., providing relative phase and/or amplitude relationships) are typically used with respect to the transducers of the array of transducers in order to focus ultrasound energy when transmitting and/or receiving ultrasound energy. For example, different beam forming parameters, setting forth the phase and/or amplitude relationship for each transducer of the array of transducers to be used in forming the image, are used for each line (or ray) of an image frame. Additional information is generally used with respect to each such line, such as for image mode (echo, color, two dimensional, etcetera), image zone (focusing depth), image resolution (number of lines, line interleaving, line increments), and the like.

In the past, the foregoing beam forming parameters and additional information has been provided using a simple "brute force" technique. Specifically, a table having separate entries for each line of each frame would be provided. The entries for a particular line would include the beam forming parameters and additional information associated with that line of the frame. In forming an image frame, the ultrasound system would step through the table entries associated with a selected frame to obtain beam forming parameters and additional information for each line thereof. Accordingly, if a frame consists of 512 lines, 512 entries would be provided in the table for that frame, with each entry including all the beam forming parameters and additional information for the appropriate line. Additionally, each frame would have separate line entries for that frame, irrespective of whether any of that information was common to another line or frame.

Use of the above tables provides a straight forward technique for beam forming data control as each frame is expressly defined by a set of table entries. Accordingly, a new or different image mode, zone, or resolution may readily be implemented by a manufacturer of the ultrasound device providing table entries defining each line of a desired image. Moreover, providing control with respect to the beam forming data and additional data is very simple as the data entries for each line of a frame may be stepped through sequentially using common direct memory access (DMA) techniques.

However, the foregoing suffers from several disadvantages. For example, the use of separate entries for each line of a frame as provided in the past requires a large amount of memory to store beam forming parameters and additional information supporting various image modes, image zones, etcetera. Specifically, although some of the information, such as the image mode, image zone, image resolution, etcetera, may remain unchanged from line to line, the separate entries for each line of a frame as implemented in the past will discretely store such information for each line. Moreover, a first frame, such as may be associated with a first image mode, image zone, image resolution, etcetera, will have discrete entries associated with each line thereof, a second frame, such as may be associated with a second image mode, image zone, image resolution, etcetera, will have discrete entries associated with each line thereof, and so on. Accordingly, although some of the information, such as beam forming parameters, may be the same as between various lines of the frames, this information will be stored separately for each frame in which it is used.

From the above, it can be appreciated that techniques for beam forming data control implemented in the past require large amounts of memory. Such large amounts of memory can require relatively large amounts of space in an ultrasound system, can consume relatively large amounts of power to operate, and can generate relatively large amounts of heat to be dissipated by the ultrasound system. Such characteristics of large memories have typically not been an issue with respect to ultrasound systems as such systems are typically cart based configurations where size, power consumption, and thermal dissipation are not critical.

BRIEF SUMMARY OF THE INVENTION

The present invention is directed to systems and methods which efficiently control storage of and/or access to data which includes repetitive data or data which is used by different modes, processes, etcetera. Where large amounts of data is stored, techniques of the present invention may be used to provide reduction in memory used for storage of data. Moreover, techniques of the present invention may be used to provide improved data transfer rates.

Embodiments of the present invention provide control for storage of and/or access to large amounts of data used in ultrasound system beam forming for image generation. Ultrasound systems for which embodiments of the present invention may be implemented provide for a variety of image modes (e.g., B mode, color Doppler, etcetera), image zones (e.g., selectable image depths, multiple depth imaging, etcetera), image resolutions (e.g., all lines, every other line, every third line, line interleaving, etcetera), and/or the like. Information, such as beam forming parameters and/or additional information, may be common between various lines in a frame, between frames of various modes, zones, resolutions, etcetera. Embodiments of the present invention operate to efficiently store and retrieve such data.

According to embodiments of the present invention, a hierarchy of sequencers are used in controlling storage of and/or access to data. For example, an embodiment utilized with respect to an ultrasound system implements a frame sequencer to provide control at a frame level while an address sequencer is implemented to provide control at a data access level. Additional sequencers may be implemented between the above mentioned frame sequencer and address sequencer, such as a line sequencer to provide control at a line level, if desired.

A frame sequencer of an embodiment of the present invention provides overall control with respect to a frame, such as to control the image mode, the image zone, the image resolution, and the sequence of lines in the frame. Frame sequencers of embodiments of the invention provide an instruction based model in which looping and incrementing of various frame parameters is implemented. Frame sequencers of embodiments of the invention utilize very little memory in order to program the frame sequencer for operation with respect to a particular desired image. Accordingly, frame sequencers of embodiments of the invention facilitate a reduction in the amount of memory utilized for beam forming, such as on the order of 200:1 to 500:1. Moreover, when an image mode or other image aspect is changed, a frame sequencer of embodiments of the present invention may be reprogrammed for operation with respect to the new desired image quickly.

An address sequencer of an embodiment of the present invention provides control with respect to data for each line of a frame. Address sequencers of embodiments of the invention provide an instruction based model in which data addresses are computed on the fly to access appropriate beam forming parameters and/or additional information which is efficiently stored for use in various image modes, image zones, image resolutions, etcetera. A multi-dimensional array or arrays of beam forming parameters and/or additional information is accessed by address sequencers of embodiments of the invention. Address sequencers of embodiments of the present invention provide for indirect addressing of data into such a multi-dimensional array, rather than being restricted to direct sequential addressing associated with the tables used in the past. Moreover, address sequencers of embodiments of the invention provide improved frame rates due to using less time to move data for lines.

From the above, it can be appreciated that techniques for beam forming data control implemented in accordance with embodiments of the present invention reduce the amount of memory utilized and provide improvements in data transfer rates without requiring more powerful/faster central processing units or other modifications which significantly increase size and/or power consumption. Accordingly, embodiments of the present invention provide benefits with respect to the use of space in an ultrasound system, power consumption, and heat generated by an ultrasound system. Such characteristics are particularly desirable with respect to small or portable ultrasound systems, where size, power consumption, and thermal dissipation can become critical.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
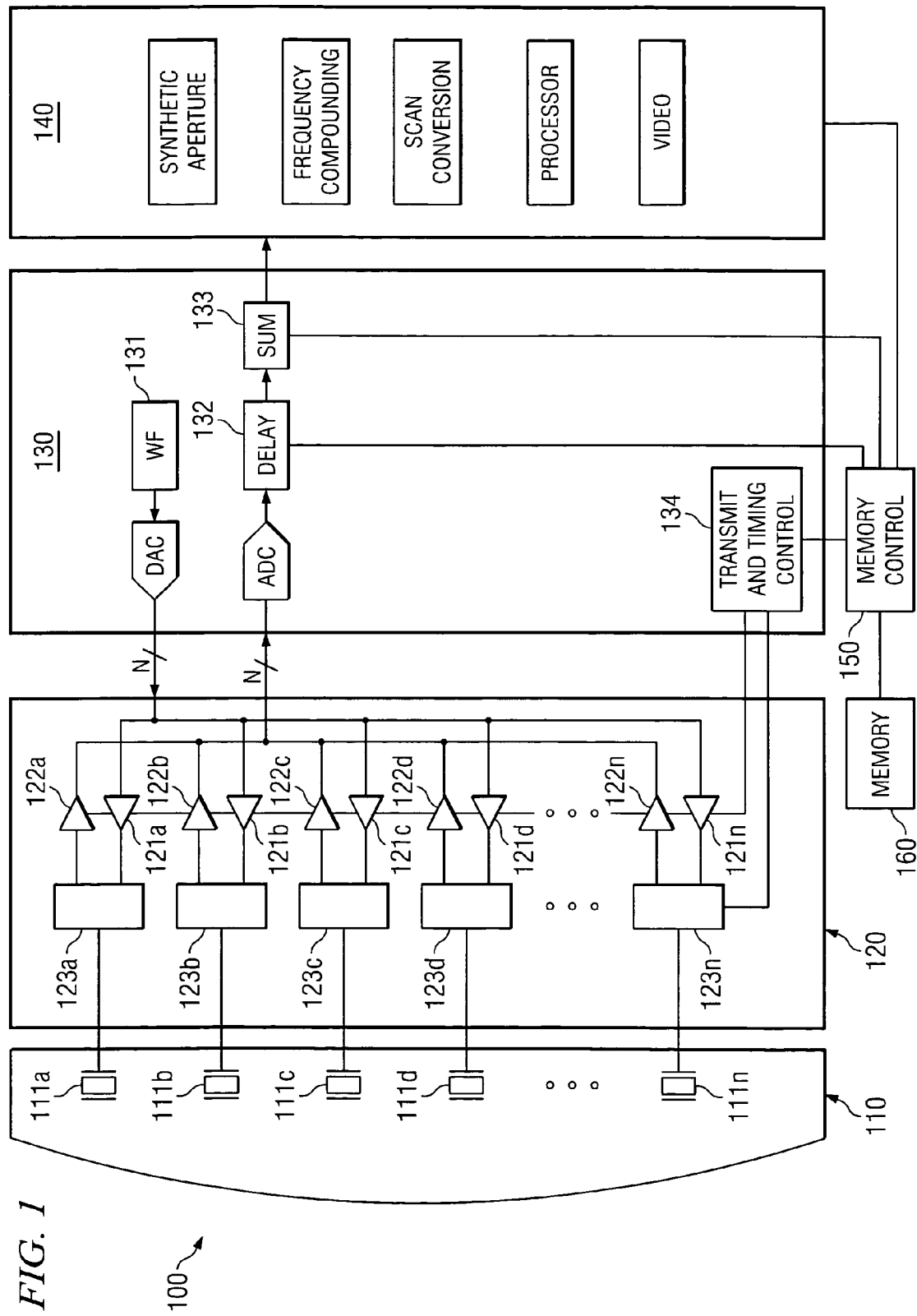
FIG. 1 shows a block diagram of a system adapted according to and embodiment of the present invention.

Directing attention to FIG. 1, ultrasound system 100 is shown adapted according to an embodiment of the present invention. Ultrasound system 100 preferably operates to generate images using transmission/reception of ultrasonic energy. Accordingly, ultrasound system 100 of the illustrated embodiment includes various circuits for the transmission and reception of ultrasonic energy and the processing of signals associated therewith. Specifically, ultrasound system 100 of the illustrated embodiment includes transducer assembly 110, transmit/receive circuitry 120, front-end circuitry 130, signal processing/back-end circuitry 140, memory control 150, and memory 160.

Ultrasound system 100 of a preferred embodiment comprises a portable or handheld ultrasound system configuration. Accordingly, ultrasound system 100 may comprise a relatively small, light weight, self contained, system for providing ultrasound imaging operation. Embodiments of ultrasound system 100 implement a high level of integration, such as may be provided using application specific integrated circuits (ASICs). For example, one or more of transmit/receive circuitry 120, front-end circuitry 130, signal processing/back-end circuitry 140, memory control 150, and memory 160 may comprise one or more ASICs. It should be appreciated that the illustrated delineation between circuitry is for reference to the illustrated embodiment and is not a limitation of the concepts of the present invention. For example, front-end circuitry 130 and memory control 150 may comprise a single ASIC, aspects of signal processing/back-end circuitry 140 may be provided on separate ASICs, etcetera, if desired.

Detail with respect to configurations of memory control 150 and memory 160 according to embodiments of the invention, as well as interaction of memory control 150 and memory 160 with other circuitry of ultrasound system 100, is provided herein. Transducer assembly 110, transmit/receive circuitry 120, front-end circuitry 130, and signal processing/back-end circuitry 140 operate in a substantially conventional manner and, therefore, their operation will not be described in complete detail herein, except where such detail is particularly useful in understanding concepts of the present invention as incorporated in embodiments of memory control 150 and memory 160. Additional detail with respect to ultrasound systems, or circuitry thereof, as may be adapted according to embodiments of the present invention is shown in U.S. Pat.

Nos. 5,722,412, entitled "Hand Held Ultrasonic Diagnostic Instrument," 5,817,024, entitled "Hand Held Ultrasonic Diagnostic Instrument with Digital Beamformer," 6,135,961, entitled "Ultrasonic Signal Processor for a Hand Held Ultrasonic Diagnostic Instrument," 6,203,498, entitled "Ultrasonic Imaging Device with Integral Display, 6,383,139, entitled "Ultrasonic Signal Processor for Power Doppler Imaging in a Hand Held Ultrasonic Diagnostic Instrument," 6,416,475, entitled "Ultrasonic Signal Processor for a Hand Held Ultrasonic Diagnostic Instrument," 6,447,451, entitled "Mobile Ultrasound Diagnostic Instrument and Docking Stand," 6,471,651, entitled "Low Power Portable Ultrasonic Diagnostic Instrument," and 6,575,908, entitled "Balance Body Ultrasound System," the disclosures of which are incorporated herein by reference.

Transducer assembly 110, having an array of transducers 111a-111n, is shown coupled to wave form generator 131 of front-end circuitry 130 via transmit amplifiers 121a-121n and duplexers 123a-123n of transmit receive circuitry 120. Accordingly, transducers of transducer assembly 110 may be excited by a wave form provided by wave form generator 131. Controlled excitation of transducers 111a-111n to cause an ultrasound wavefront focused in a particular direction and/or to a particular depth (e.g., transmit beam forming) to propagate into an adjacent medium, e.g., a human body, is provided according to the illustrated embodiment by memory control 150 accessing appropriate beam forming parameters and additional information from memory 160 and providing the foregoing to front-end circuitry 130. For example, memory control 150 may provide beam forming parameters and additional information, such as image mode, image zone, and/or image resolution, to transmit and timing control circuit 134 in order to control appropriate ones of duplexers 123a-123n to allow a wave form from wave form generator 131 to excite selected ones of the transducers and/or to control appropriate ones of transmit amplifiers 121a-121n to attenuate/amplify a wave form signal as provided to corresponding ones of the transducers. The ultrasound wavefront produced by transducer assembly 110 may thus be focused in a particular direction, to a particular depth, etcetera and will travel through the medium until reflected by an object or other variation in density of the medium experienced by the propagating wavefront.

Transducer assembly 110 is further shown coupled to signal processing/back-end circuitry 140 via duplexers 123a-123n and receive amplifiers 122a-122n of transmit receive circuitry 120 and delay circuit 132 and summing circuit 133 of front-end circuitry 130. Accordingly, when transducers of transducer assembly 110 are excited by ultrasonic energy reflected by an object or other variation in the density of the medium, a received signal may be provided to signal processing/back-end circuitry 140, such as for presenting a graphical image, analysis, recording, etcetera. Processing and combining of signals as received by individual transducers of transducer assembly 110 in order to generate a received signal focused with respect to a particular direction and/or a particular depth (e.g., receive beam forming) is provided according to the illustrated embodiment by memory control 150 accessing appropriate beam forming parameters and additional information from memory 160 and providing the foregoing to front-end circuitry 130. For example, memory control 150 may provide beam forming parameters and additional information, such as image mode, image zone, and/or image resolution, to delay circuit 132, summing circuit 133, and/or transmit and timing control circuit 134 in order to control appropriate ones of duplexers 123a-123n to allow a received signal from selected ones of the transducers to be provided to corresponding ones of receive amplifiers 122a-122n, to control appropriate ones of receive amplifiers 122a-122n to attenuate/amplify a signal as provided by corresponding ones of the transducers, to introduce/adjust relative phase delays with respect to the signals associated with particular transducers, and/or to sum signals associated with particular transducers into a beam formed signal. The received signal produced by transducer assembly 110 may thus be focused in a particular direction, to a particular depth, etcetera for use by ultrasound system 100 to process an image.

From the above, it can be appreciated that control of ultrasound beam forming data by memory control 150 comprises control of different beam forming parameters, setting forth the phase and/or amplitude relationship for each transducer of the array of transducers to be used in forming the image, for each line of an image frame as well as additional information used with respect to each such line, such as for image mode (echo, color, two dimensional, etcetera), image zone (depth), image resolution (number of lines), and the like. Much of the foregoing information may be used in various different frames and/or lines. For example, frames associated with different image modes may have one or more line formed using the same beam forming parameters. Likewise, different lines, whether associated with a same frame or different frames, may use some of the same information, such as image zone, image mode, etcetera. Accordingly, memory 160 of embodiments of the present invention is configured to efficiently store the foregoing information. Correspondingly, memory control 150 of embodiments of the present invention is configured to implement logic for an instruction based model in which looping and incrementing of various frame parameters is implemented and/or in which data addresses are computed on the fly to access appropriate information.

Memory control 150 of embodiments may be implemented in any number of technologies suitable for providing an instruction based model as described herein. For example, memory control 150 may comprise a central processing unit (CPU) operable under control of an instruction set defining operation as described herein. However, embodiments of the present invention implement memory control 150 in one or more ASIC in order to provide an implementation which uses relatively little space, has a relatively low power draw, and/or produces relatively little heat.

Memory 160 of embodiments may be implemented in any number of technologies suitable for providing data storage and access as described herein. For example, memory 160 may comprise random access memory (RAM), read only memory (ROM), erasable programmable read only memory (EPROM), flash memory, magnetic memory, optical memory, and/or the like. However, embodiments of the present invention implement memory 160 using non-volatile memory having a relatively low power requirement, such as EPROM or flash memory.

Figure 2:
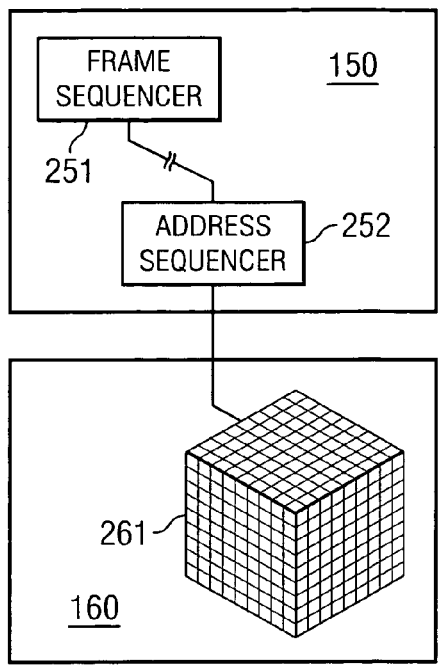
FIG. 2 shows detail with respect to and embodiment of the memory control and memory of the system of FIG. 1.

FIG. 2 shows detail with respect to memory control 150 and memory 160 of an embodiment of the present invention. The embodiment of memory control 150 illustrated in FIG. 2 provides a hierarchy of sequencers for use in controlling storage of and/or access to data. Specifically, frame sequencer 251, for providing control at a frame level, and address sequencer 252, for providing control at a data access level, are shown with respect to memory control 150. It should be appreciated that additional or alternative sequencers may be implemented according to embodiments of the present invention. For example, a line sequencer, providing control at a line level, is disposed in the hierarchy between the above mentioned frame sequencer and address sequencer according to an embodiment of the present invention.

Frame sequencer 251 of the illustrated embodiment of provides overall control with respect to a frame, such as to control the image mode, the image zone, the image resolution, and the sequence of lines in the frame by implementing looping and incrementing of various frame parameters. Accordingly, in operation according to an embodiment of the invention, frame sequencer 251 provides control with respect to other sequencers (e.g., address sequencer 252) of memory control 150 step through the lines of the frame, to implement the proper image mode, zone, and/or resolution, etcetera. For example, for every line of the frame, frame sequencer 251 of a preferred embodiment provides parameters to other sequencers of memory control 150 with respect to what line is currently being processed, what zone is being imaged, and what mode has been selected. Those parameters are used by the other sequencers of memory control 150 to cause the desired line to be processed appropriately.

Figure 3:
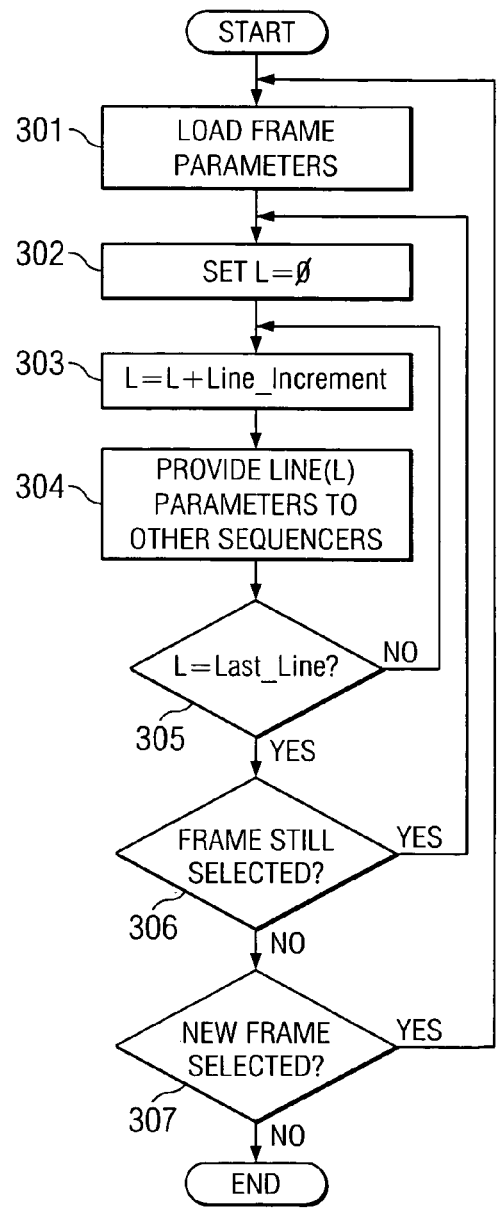
FIG. 3 shows a flow diagram of operation of a frame sequencer of an embodiment of the present invention.

FIG. 3 shows a flow diagram of operation of frame sequencer 251 according to a simplified exemplary embodiment of the present invention. The flow diagram of FIG. 3 begins at block 301 wherein after a particular frame (e.g., an image mode, an image zone, and an image resolution) has been selected the appropriate frame parameters are loaded by frame sequencer 251. The foregoing frame parameters may comprise a number of lines in the frame, a range of lines in the frame, a beginning line for the frame aperture, an ending line for the frame aperture, a base address for line beam forming parameters, a line increment amount, image mode information, image zone information, image resolution information, and/or the like. At block 302 a line counter (L) is initialized to provide for incrementing through the lines of the frame. Correspondingly, the line counter (L) is incremented by a line increment amount of the frame parameters at block 303.

It should be appreciated that a line counter need not be incremented each time line information is controlled by frame sequencer 251, according to embodiments of the invention. For example, one or more of the aforementioned frame parameters may indicate that an image mode, such as Doppler, is to be utilized with respect to one or more lines. Accordingly, frame sequencer 251 may operate to cause multiple samples to be taken at a same line to provide desired information, such as movement, etcetera. Additionally, such a technique may be established as a nested loop to provide for sampling a number of lines multiple times (whether each line is sampled multiple lines before moving to the next, or a sampling of a series of lines is repeated multiple times), if desired.

At block 304, line parameters of the current line are provided to one or more other sequencers of memory control 150. Such parameters may comprise, and/or be utilized by the other sequencers to determine, the current line, a base address for beam forming parameters of the frame, an offset for beam forming parameters of the current line, the image mode for the current frame and/or line, the image zone for the current frame and/or line, the image resolution for the current frame and/or line, etcetera. Using the foregoing parameters, an ultrasound pulse or pulses may be transmitted by transducer assembly 110 having a wave front propagating in a desired direction and/or focused to a desired depth, an echo may be received by transducer assembly 110 during a receive window, and the resulting signals beam formed to provide one or more line signals for producing an image and/or for other processing by circuitry of ultrasound system 100.

At block 305 a determination is made as to whether the line counter (L) has been incremented to the last line of the currently selected frame. If the line counter (L) has not yet been incremented to the last line of the currently selected frame, processing returns to block 303 wherein the line counter (L) is again incremented by the line increment amount. Accordingly, a loop is established for processing each line of a currently selected frame. If, however, the line counter (L) has been incremented to the last line of the currently selected frame, processing falls out of the aforementioned loop to block 306.

At block 306 a determination is made as to whether the frame for which processing has just completed remains selected. For example, a user may select a different image mode, a different image zone, etcetera, causing a different frame to be selected for processing. If the frame remains selected, processing returns to block 302 wherein the line counter (L) is again initialized. Accordingly, a loop is established for again processing the selected frame, thus providing a series of frame updates, such as for processing moving images. If, however, the frame does not remain selected, processing falls out of the aforementioned loop to block 307.

At block 307 a determination is made as to whether a new frame has been selected. If a new frame has been selected, e.g., a user selected a different image mode, a different image zone, etcetera, processing returns to block 301 wherein the appropriate frame parameters are loaded by frame sequencer 251. Accordingly, a loop is established for processing different frames. If, however, a new frame has not been selected, processing according to the illustrated embodiment ends.

From the above, it should be appreciated that frame sequencer 251 of the illustrated embodiment utilizes very little memory in order to program the frame sequencer for operation with respect to a particular desired image. Moreover, when an image mode or other image aspect is changed, frame sequencer 251 of embodiments of the present invention may be reprogrammed for operation with respect to the new desired image quickly.

It should be appreciated that the foregoing exemplary embodiment of operation of frame sequencer 251 has been simplified in order to aid in the understanding of the concepts of the present invention. Operation of a frame sequencer of embodiments of the present invention may vary significantly from that of the illustrated embodiment. For example, a frame sequencer of embodiments of the present invention may invoke nested loops for controlling lines of various imaging modes and/or zones. According to one embodiment, a frame sequencer may provide for lines of a first mode (e.g., B mode) and lines of a second mode (e.g., Doppler), where an image to be produced includes an image of one mode superimposed upon an image of another mode, using a loop similar to that described above with respect to blocks 303-305 for the first mode and having a loop similar to that described above with respect to blocks 303-305 for the second mode nested within the first loop. When implementing such nested loops, the frame parameters loaded by frame sequencer 251 preferably include parameters for each such loop/mode. Likewise, line counters, line incrementers, and/or other housekeeping functions are preferably adapted to track each such loop/mode.

Address sequencer 252 of the illustrated embodiment provides control with respect to data for each line of a frame using parameters supplied by frame sequencer 251. For example, a preferred embodiment address sequencer 252 provides an instruction based model in which data addresses within multi-dimensional array 261 of memory 160 are computed on the fly to access appropriate beam forming parameters and/or additional information. Beam forming parameters and additional information is preferably stored efficiently within multi-dimensional array 261 such that such information is available for use in various image modes, image zones, image resolutions, etcetera without having been discretely stored for each such image modes, image zones, image resolutions, etcetera. For example, multi-dimensional array 261 may store one copy of beam forming parameters for each beam to be formed by ultrasound system 100. These beam forming parameters are preferably organized in multi-dimensional array 261 such that the location of beam forming parameters and/or additional information of a desired beam configuration are readily locatable from a reference, such as a base address. Accordingly, address sequencer 252 of embodiments of the invention provides indirect addressing of data into multi-dimensional array 261, rather than being restricted to direct sequential addressing associated with the tables used in the past.

Embodiments of the invention organize data in multi-dimensional array 261 of memory 160 to match a register address space of front-end circuitry 130. Accordingly, the starting address of data in multi-dimensional array 261 may be calculated by address sequencer 252, with data beginning at this address being ordered to match the internal addressing of front-end circuitry 130. Such embodiments facilitate very efficient DMA transfers because blocks of contiguous addresses are defined in both the source memory 160 and the target registers of front-end circuitry 130.

Figure 4:
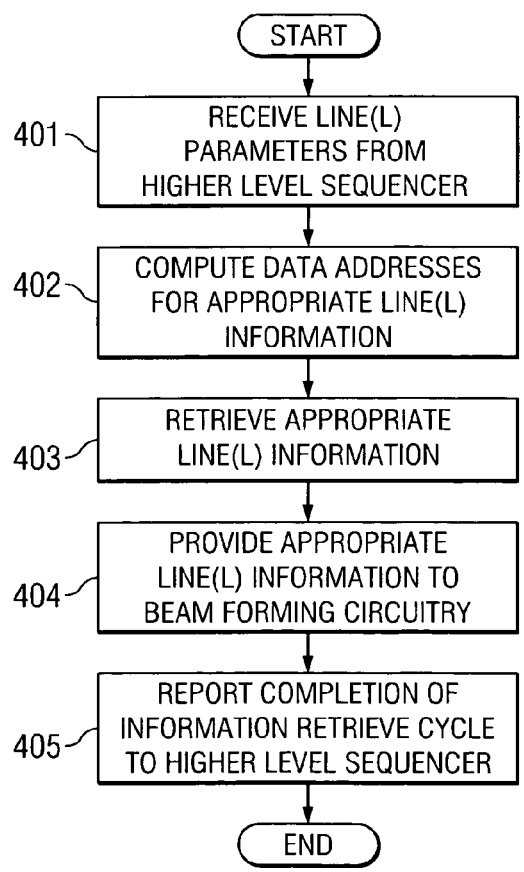
FIG. 4 shows a flow diagram of operation of an address sequencer of an embodiment of the present invention.

FIG. 4 shows a flow diagram of operation of address sequencer 252 according to a simplified exemplary embodiment of the present invention. The flow diagram of FIG. 4 begins at block 401 wherein address sequencer 252 receives parameters associated with the current line (L) from a higher level sequencer. The higher level sequencer providing the parameters to address sequencer 252 may comprise frame sequencer 251 discussed above. Additionally or alternatively, the higher level sequencer providing the parameters to address sequencer 252 may comprise a sequencer disposed in the hierarchy between frame sequencer 251 and address sequencer 252, such as the aforementioned line sequencer.

At block 402 address sequencer 252 computes data addresses within multi-dimensional array 261 wherein appropriate line information is stored. For example, address sequencer 252 may utilize a base address, image mode information, image zone information, image resolution information, and/or current line information to determine an address range of multi-dimensional array 261 in which the appropriate beam forming parameters and/or additional information for the current line may be found. According to one embodiment, the foregoing address determination is made by determining an offset from the base address in a first dimension of multi-dimensional array 261 associated with an image mode being used, determining an offset from the base address in a second dimension of multi-dimensional array 261 associated with an image zone being used, determining an offset from the base address in a third dimension of multi-dimensional array 261 associated with a current line, and so forth. The resulting offset address may contain the actual line information desired and/or may contain one or more pointers to the actual line information desired, such as where some or all of the line information desired is stored outside of multi-dimensional array 261 (e.g., elsewhere within memory 160). The foregoing resulting offset address may comprise multiple offset addresses, such as a first offset address associated with beam forming parameters and a second offset address associated with additional information for the current line.

At block 403 the appropriate information for the current line (L) is retrieved by address sequencer 252. As discussed above, such information may be retrieved from the address range determined with respect to multi-dimensional array 261 and/or may be retrieved from memory locations outside of multi-dimensional array 261.

At block 404 address sequencer 252 provides the retrieved line information to circuitry of ultrasound system 100 for use. In the example described herein, the retrieved information comprises beam forming parameters and/or additional information used in transmission/reception of ultrasound energy and thus may be provided to beam forming circuitry, such as delay circuitry 132, summer circuitry 133, and/or transmit and timing control circuitry 134. Such information may be provided to the foregoing circuitry directly by address sequencer 252 or may be provided indirectly to the foregoing circuitry, such as through one or more higher level sequencers.

At block 405 address sequencer 252 reports completion of having provided the desired information to the appropriate circuitry to one or more higher level sequencer. For example, address sequencer 252 may provide the foregoing report to a line sequencer in order to notify the line sequencer that a transmit pulse of a current line may be accomplished. Thereafter, address sequencer 252 may repeat information retrieval and providing steps for receive beam forming parameters and/or other information and again report the conclusion of the cycle so that a receive signal may be processed.

After block 405 of the illustrated embodiment address sequencer 252 has completed processing with respect to the current line and thus the flow diagram ends. However, a higher level sequencer, such as frame sequencer 251, may increment the current line and thus again invoke the steps of the flow as set forth in FIG. 4.

From the above, it should be appreciated that address sequencer 252 of the illustrated embodiment enables beam forming parameters and/or additional information used with respect to transmission/reception of ultrasound energy to be stored in memory 160 very efficiently. In particular, embodiments of the address sequencer provide intelligence to calculate the addresses for stored blocks of data which are common between different modes, lines, etcetera. Moreover, because the addresses are determined on the fly according to embodiments of the invention, frame rates may be improved due to it not taking as long to move the appropriate data.

It should be appreciated that the foregoing exemplary embodiment of operation of address sequencer 252 has been simplified in order to aid in the understanding of the concepts of the present invention. Operation of an address sequencer of embodiments of the present invention may vary significantly from that of the illustrated embodiment. For example, an address sequencer of embodiments of the present invention may invoke data address computation, information retrieval, and/or information providing steps in addition to or in the alternative to those shown, such as to provide different beam forming parameters and/or additional information for a transmit and receive portion of the current line.

Although embodiments of an address sequencer of the present invention have been described with respect to their use in accessing information used for beam forming, it should be appreciated that address sequencers of embodiments of the present invention may be utilized to provide information access with respect to various system operations. For example, a processor (e.g., CPU) of signal processing/back-end circuitry 140 may operate to move data, such as to save a JPEG image or do various types of drawing on a video output. An address sequencer as described herein could be applied to such a situation to allow the processor to move image data by providing the address sequencer with appropriate parameters, such as an image number or type of image, and allowing the address sequencer to do calculations on its own in terms of what the source and destination addresses would be and how much data to move around.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An ultrasound imaging system comprising:
a memory containing a multi-dimensional array storing information used in beam forming with respect to ultrasound signals, said stored information containing beam forming parameters of a plurality of beam configurations individually locatable from a base address; and
a memory control having a hierarchy of sequencers controlling access to said information stored in said multi-dimensional array during processing of said ultrasound signals, wherein said hierarchy of sequencers include a sequencer configured to compute a data address relative to said base address for beam forming parameters contained in said multi-dimensional array wherein said hierarchy of sequencers comprises: a frame sequencer providing control with respect to accessing information for completing a frame; and an address sequencer providing control with respect to accessing particular information under control of said frame sequencer; said address sequencer determines an address of information for a current line using at least one parameter provided thereto from said frame sequencer; and said address is determined as an offset from said base address in at least one dimension of said multi-dimensional array.

2. The system of claim 1, wherein a dimension of said multi-dimensional array is associated with at least one of an image mode, an image zone, and an image line.

3. The system of claim 1, wherein said information stored in said multi-dimensional array comprises information other than beam forming parameters which is used in said processing said signals.

4. The system of claim 1, wherein said information stored in said multi-dimensional array comprises pointer information identifying where information which is used in said processing said signals is stored.

5. The system of claim 1, wherein said frame sequencer provides control on a line-by-line basis.

6. The system of claim 1, wherein said frame sequencer is initialized for use in different imaging modes by providing parameters thereto.

7. The system of claim 1, wherein said hierarchy of sequencers are implemented in one or more application specific circuit.

8. The system of claim 1, wherein said ultrasound imaging system comprises a portable diagnostic ultrasound instrument.

9. The system of claim 1, wherein said multi-dimensional array comprises at least a three dimensional array.

10. A method for accessing information used in ultrasound imaging system beam forming, said method comprising:
storing said information used in beam forming in a multi-dimensional array in a memory, said stored information containing beam forming parameters of a plurality of beam configurations individually locatable from a base address;
determining an address for desired information corresponding to a beam configuration stored in said multi-dimensional array on a line-by-line basis, said determining using information with respect to a current frame and information with respect to a current line of said current frame to determine said address as an offset from a said base address and providing a hierarchy of sequencers for controlling access to said information stored in said multi-dimensional array, wherein said hierarchy of sequencers comprises: a frame sequencer providing control with respect to accessing information for completing a frame; and an address sequencer providing control with respect to accessing particular information under control of said frame sequencer; said address sequencer determines an address of information for a current line using at least one parameter provided thereto from said frame sequencer.

11. The method of claim 10, wherein a dimension of said multi-dimensional array is associated with at least one of an image mode, an image zone, and an image line.

12. The method of claim 10, wherein said information stored in said multidimensional array comprises information other than beam forming parameters which is used with respect to beam forming signals.

13. The method of claim 10, wherein said information stored in said multi-dimensional array comprises pointer information identifying where desired information is stored.

14. The method of claim 10; wherein said storing said information comprises storing parameters for forming a particular beam a single time in said multi-dimensional array although said particular beam is used in multiple different image modes.

15. The method of claim 10, wherein at least another one of said sequencers of said hierarchy of sequencers provides control of said at least one sequencer.

16. The method of claim 10, further comprising:
providing different frame parameters to said at least another one of said sequencers to cause said at least one sequencer to determine addresses for a different operational mode.

17. The method of claim 10, wherein said multi-dimensional array comprises at least a three dimensional array.

18. A system comprising:
a memory storing a plurality of information blocks in a multi-dimensional array, said information blocks individually containing beam forming parameters of a beam configuration and being individually locatable from a base address a memory control having a hierarchy of sequencers for controlling access to said information stored in said multi-dimensional array, wherein said hierarchy of sequencers comprises: a frame sequencer providing control with respect to accessing information for completing a frame; and an address sequencer providing control with respect to accessing particular information under control of said frame sequencer; said address sequencer determines an address of information for a current line using at least one parameter provided thereto from said frame sequencer; and said address is determined as an offset from said base address in at least one dimension of said multi-dimensional array; and
memory control logic providing computation of an address for a particular information block of said plurality of information blocks currently desired in a series of calls to said memory for accessing information blocks of said plurality of information blocks, said computation of said address being based at least in part upon a plurality of parameters having information with respect to a particular task information of accessed ones of said information blocks is being used for.

19. The system of claim 18, wherein a dimension of said multi-dimensional array is associated with at least one of an image mode, an image zone, and an image line.

20. The system of claim 18, wherein information of said plurality of information blocks comprises pointer information.

21. The system of claim 18, wherein said memory control logic further provides incrementing of at least one parameter used in said computation of said address.

22. The system of claim 21, wherein said incrementing is provided by a frame sequencer of said memory control logic and said address computation is provided by an address sequencer of said memory control logic.

23. The system of claim 18, wherein said system comprises an ultrasound imaging system.

24. The system of claim 18, wherein said particular task comprises providing beam forming with respect to an ultrasound signal.

25. The system of claim 18, wherein said particular task comprises drawing an image.

26. The system of claim 18, wherein said particular task comprises saving an image.

* * * * *